US009582427B2

(12) United States Patent
Heidelberger et al.

(10) Patent No.: US 9,582,427 B2
(45) Date of Patent: *Feb. 28, 2017

(54) IMPLEMENTING SELECTIVE CACHE INJECTION

(71) Applicant: International Business Machines Corporation, Armonk, NY (US)

(72) Inventors: Philip Heidelberger, Cortlandt Manor, NY (US); Hillery C. Hunter, Chappaqua, NY (US); James A. Kahle, Austin, TX (US); Ravi Nair, Briarcliff Manor, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/841,610

(22) Filed: Aug. 31, 2015

(65) Prior Publication Data

US 2015/0370719 A1 Dec. 24, 2015

Related U.S. Application Data

(63) Continuation of application No. 13/950,371, filed on Jul. 25, 2013, now Pat. No. 9,218,291.

(51) Int. Cl.
*G06F 12/08* (2016.01)
*G06F 12/12* (2016.01)

(52) U.S. Cl.
CPC ........ *G06F 12/0888* (2013.01); *G06F 12/126* (2013.01); *G06F 2212/1024* (2013.01); *G06F 2212/604* (2013.01)

(58) Field of Classification Search
CPC .................. G06F 12/0888; G06F 12/126
(Continued)

(56) References Cited

U.S. PATENT DOCUMENTS 5,960,461 A * 9/1999 Frank ............... G06F 9/30003
711/117
6,314,500 B1 11/2001 Rose
(Continued)

FOREIGN PATENT DOCUMENTS

| EP | 1055998 A2 | 11/2000 |
| GB | WO 2007071606 A3 | 6/2007 |
| WO | WO9923564 A1 | 5/1999 |

OTHER PUBLICATIONS

Anonymous, "Level-Preserving Memory-Copy Acceleration Method", Jun. 18, 2012, IP.com No. IPCOM000219031D, pp. 1-3.
(Continued)

*Primary Examiner* — Stephen Elmore
(74) *Attorney, Agent, or Firm* — Joan Pennington

(57) ABSTRACT

A method, system and memory controller for implementing memory hierarchy placement decisions in a memory system including direct routing of arriving data into a main memory system and selective injection of the data or computed results into a processor cache in a computer system. A memory controller, or a processing element in a memory system, selectively drives placement of data into other levels of the memory hierarchy. The decision to inject into the hierarchy can be triggered by the arrival of data from an input output (IO) device, from computation, or from a directive of an in-memory processing element.

9 Claims, 4 Drawing Sheets

(58) Field of Classification Search
USPC .................. 711/138, 154, 156, 205, 221
See application file for complete search history.

(56) References Cited

U.S. PATENT DOCUMENTS

| | | | |
|---|---|---|---|
| 6,330,649 B1 * | 12/2001 | Frank .................. | G06F 9/30003 |
| | | | 711/117 |
| 6,694,412 B2 * | 2/2004 | Frank .................. | G06F 9/30003 |
| | | | 711/153 |
| 7,155,572 B2 | 12/2006 | Hughes et al. | |
| 7,484,062 B2 | 1/2009 | Arimilli et al. | |
| 7,730,265 B1 * | 6/2010 | Cypher .................. | G06F 12/126 |
| | | | 710/200 |
| 7,774,554 B2 | 8/2010 | Chaudyary et al. | |
| 7,917,698 B2 * | 3/2011 | Cypher ............... | G06F 12/0842 |
| | | | 711/108 |
| 8,051,253 B2 | 11/2011 | Okin et al. | |
| 8,443,147 B2 | 5/2013 | Brewer et al. | |
| 8,533,424 B2 | 9/2013 | Grube et al. | |
| 8,661,209 B2 | 2/2014 | Hara | |
| 8,856,464 B2 | 10/2014 | Karamcheti et al. | |
| 8,914,581 B2 | 12/2014 | Hathaway et al. | |
| 9,037,804 B2 | 5/2015 | Steely, Jr. et al. | |
| 9,218,291 B2 * | 12/2015 | Heidelberger ...... | G06F 12/0888 |
| | | | 711/138 |
| 9,268,710 B1 * | 2/2016 | Cypher .................. | G06F 9/3004 |
| 2006/0136681 A1 | 6/2006 | Jain et al. | |
| 2007/0150671 A1 | 6/2007 | Kurland | |
| 2008/0082766 A1 | 4/2008 | Okin et al. | |
| 2008/0201532 A1 | 8/2008 | Chaudhardy | |
| 2009/0157966 A1 | 6/2009 | Gregg et al. | |
| 2009/0198908 A1 | 8/2009 | Arimilli et al. | |
| 2010/0042787 A1 | 2/2010 | Auernhammer et al. | |
| 2013/0304990 A1 | 11/2013 | Bass et al. | |
| 2014/0281084 A1 | 9/2014 | Fleischer et al. | |

OTHER PUBLICATIONS

Anonymous, "Cache Control in a Non-Volatile Memory Device", Mar. 4, 2007, IP.com No. IPCOM000147008lD, pp. 1-17.

* cited by examiner

IMPLEMENTING SELECTIVE CACHE INJECTION

This application is a continuation application of Ser. No. 13/950,371 filed Jul. 25, 2013, now U.S. Pat. No. 9,218,291, issued Dec. 22, 2015.

FIELD OF THE INVENTION

The present invention relates generally to the data processing field, and more particularly, relates to a method, system and memory controller for implementing memory hierarchy placement decisions in a memory subsystem including direct routing of arriving data into a main memory system and selective injection of the data or computed results into a processor cache in a computer system.

DESCRIPTION OF THE RELATED ART

Modern computer systems typically are configured with a large amount of memory in order to provide data and instructions to one or more processors in the computer systems.

Historically, processor speeds have increased more rapidly than memory access times to large portions of memory, in particular, DRAM memory (Dynamic Random Access Memory). Memory hierarchies have been constructed to reduce the performance mismatches between processors and memory. For example, most modern processors are constructed having an L1 (level 1) cache, constructed of SRAM (Static Random Access Memory) on a processor semiconductor chip. L1 cache is very fast, providing reads and writes in only one, or several cycles of the processor. However, L1 caches, while very fast, are also quite small, perhaps 64 KB (Kilobytes) to 256 KB. An L2 (Level 2) cache is often also implemented on the processor chip. L2 cache is typically also constructed using SRAM storage, although some processors utilize DRAM storage. The L2 cache is typically several times larger in number of bytes than the L1 cache, but is slower to read or write. Some modern processor chips also contain higher level cache, such as an L3 (Level 3) cache. L3 cache is capable of holding several times more data than the L2 cache. L3 cache is sometimes constructed with DRAM storage. L3 cache in some computer systems is implemented on a separate chip or chips from the processor, and is coupled to the processor with wiring on a printed wiring board (PWB) or a multi-chip module (MCM). Main memory of the computer system is typically large, often many GB (gigabytes) and is typically implemented in DRAM.

Main memory is typically coupled to a processor with a memory controller, which may be integrated on the same device as the processor or located separate from the processor, often on the same MCM (multi-chip module) or PWB. The memory controller receives load or read commands and store or write commands from the processor and services those commands, reading data from main memory or writing data to main memory. Typically, the memory controller has one or more queues, for example, read queues and write queues. The read queues and write queues buffer information including one or more of commands, controls, addresses and data; thereby enabling the processor to have multiple requests—including read and/or write requests, in process at a given time.

Extensive research and development efforts are invested by the industry, on an ongoing basis, to create improved, innovative solutions for maximizing overall system performance and density by improving the memory system or memory subsystem design and structure.

New data may enter the system through several means including either arrival from some external entity, or modification of existing data values. Today, with few exceptions, data arriving at a processor is inserted into two potential locations including 1) main memory, in systems with no cache injection support; and 2) processor cache, if cache injection is supported. If data is placed in main memory in conventional arrangements, then the data must travel over the memory bus twice before it can be processed. If placed in a cache, the data can be evicted before the processor accesses this data in the cache.

A problem of state of the art computer systems is that the processor might not actually need the data (which has come in off the network, or otherwise from IO), or the processor might not need it right now. Data thus inserted into the caches frequently pollutes the caches, since the data is not immediately needed for computation, and unnecessarily takes up space in the cache.

In a memory system, it is desirable to place data directly into the memory instead of a processor cache. Also it can difficult to know which processor cache data should be placed in non-shared caches if the work has not been scheduled. Large data block moves that are cache injected often would just roll caches and would cause a loss of performance. Small data updates would be very random and most likely occur on data that is currently in memory and not in a cache.

A need exists for an effective mechanism having the ability to insert arriving data directly into the main memory system and selectively inject the data or computed results into a processor cache in a computer system.

As used in the following description and claims, the terms should be broadly understood as set forth in the following:

Cache injection is a process of inputting data from main memory into a processor cache.

Memory-routed data is data sent directly to main memory without insertion into a processor cache.

SUMMARY OF THE INVENTION

Principal aspects of the present invention are to provide a method, system and memory controller for implementing memory hierarchy placement decisions and selective injection of data or computed results into a processor cache in a main memory subsystem in a computer system. Other important aspects of the present invention are to provide such method, system and memory controller substantially without negative effects and that overcome many of the disadvantages of prior art arrangements.

In brief, a method, system and memory controller for implementing memory hierarchy placement decisions in a memory system including direct routing of arriving data into a main memory system and selective injection of the data or computed results into a processor cache in a computer system. A memory controller, or processing elements in a memory subsystem, selectively drives placement of data into a level of the memory hierarchy. The decision to place data into the memory hierarchy can be triggered by the arrival of data from an input output (IO) device, from computation, or from a directive of an in-memory processing element.

In accordance with features of the invention, the data for which a placement decision is made includes the data which was received, computed, or otherwise changed; and other data or computed results.

In accordance with features of the invention, the memory controller, or in-memory processing elements inject data into the processor cache, after that data, or other data has been held, analyzed, computed, or otherwise changed in the memory.

In accordance with features of the invention, the memory controller, or in-memory processing elements injecting data into the processor cache, further includes updating state information for the injected data to keep the processor cache from evicting the injected data until the processor has accessed or deallocated the injected data. The injected cache data optionally includes directory bits that are set to prevent eviction, and that are cleared when the injected cache data is accessed or deallocated by the processor.

In accordance with features of the invention, the processor optionally sends a trigger or special load or store instruction to prompt computation on the data in memory.

In accordance with features of the invention, the injection of data or computed results from main memory into the processor cache optionally includes a processor wake-up or notification.

In accordance with features of the invention, derived data optionally is created and pre-loaded into the processor cache, for example, for potential additional computation.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and memory controller are provided for implementing memory hierarchy placement decisions including direct routing of arriving data into a main memory system and selective injection of the data or computed results into the processor cache.

Figure 1:
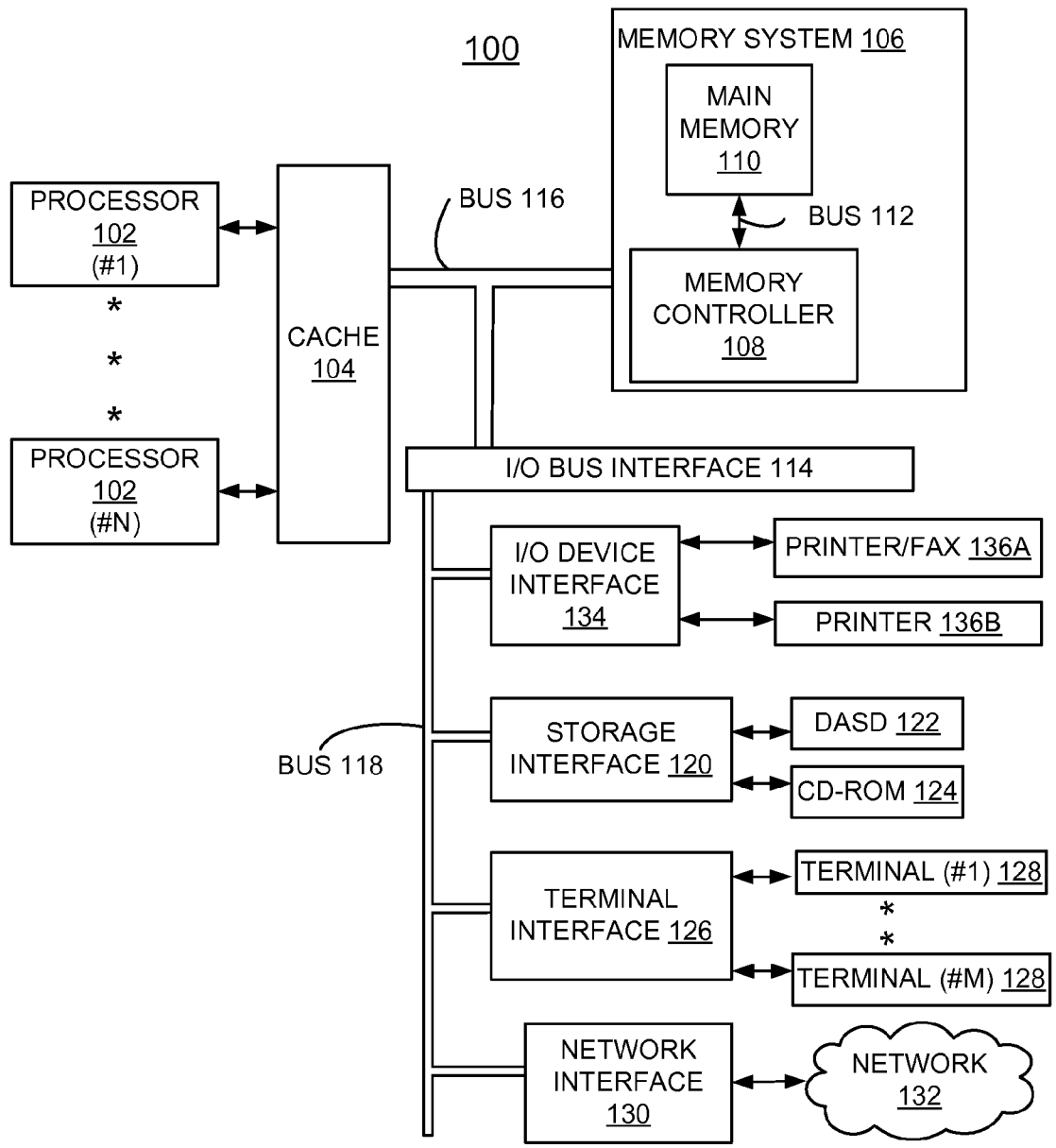
FIG. 1 is a block diagram of an example computer system embodying the present invention.

Having reference now to the drawings, in FIG. 1, there is shown a computer system embodying the present invention generally designated by the reference character 100 for implementing memory hierarchy placement decisions in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. The illustrated computer system 100 is not intended to imply architectural or functional limitations. Although main memory 102 and cache 106 are represented conceptually in FIG. 1 as single entities, it will be understood that in fact these are more complex, and that cache may exist at multiple different levels, as is known in the art. In particular, main memory subsystem 102 comprises multiple modules and communications components. The present invention can be used with various hardware implementations and systems and various other internal hardware devices, for example, multiple main processors.

Figure 2:
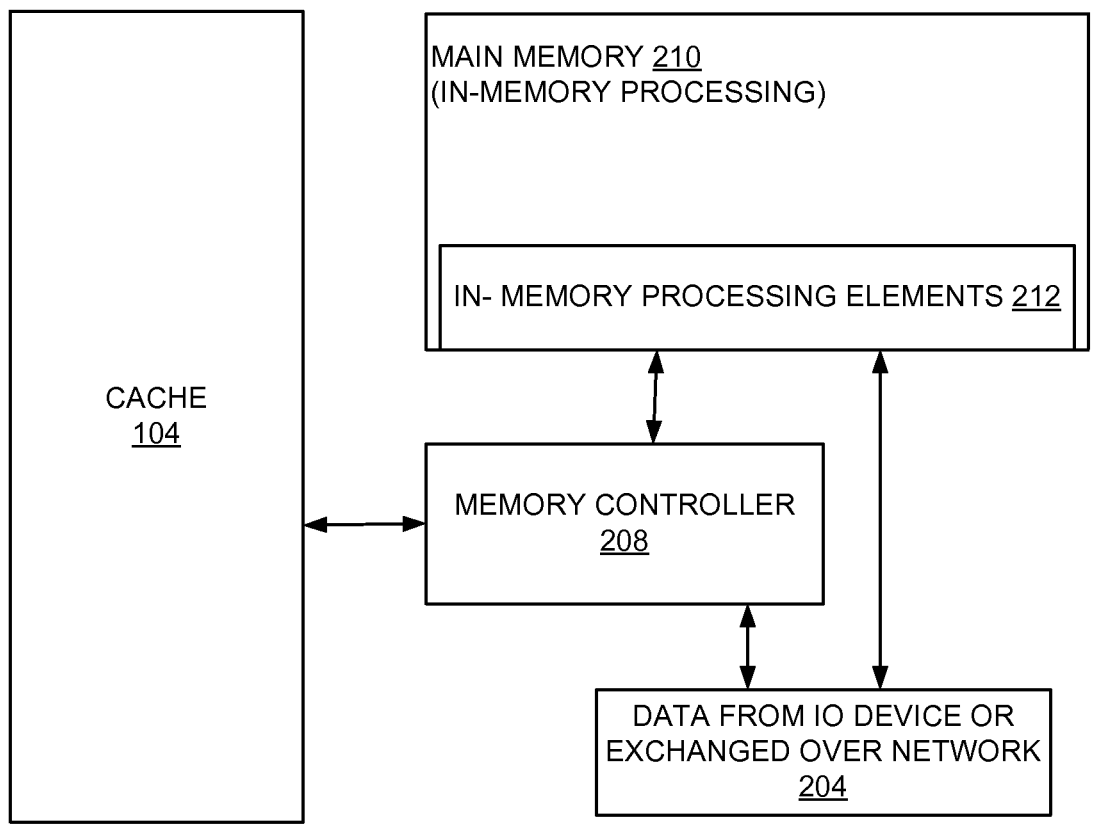
FIG. 2 is a block diagram illustrating an example memory system for implementing memory hierarchy placement decisions including direct routing of arriving data into a main memory system and selective injection of the data or computed results into the processor cache in the computer system of FIG. 1 in accordance with the preferred embodiment.

In accordance with embodiments of the invention, an example memory system 200 is further illustrated and described with respect to FIG. 2.

Referring now to FIG. 2, there is shown an example memory system generally designated by the reference character 200 for implementing memory hierarchy placement decisions including direct routing of arriving data into a main memory system and selective injection of the data or computed results into the processor cache 104 in the computer system 100 in accordance with the preferred embodiment. In the memory system 200, as indicated in a block 204 data is received from an IO device or data is exchanged over the network, such as network 132 in FIG. 1.

Memory system 200 includes a memory controller 208, which makes memory hierarchy placement decisions, and a main memory 210 arranged for in-memory processing. Memory system 200 includes in-memory processing elements 212 that are contained in the memory controller 208, the main memory 210 or in a separate chip, for example, attached to the memory controller 208 or the main memory 210. The in-memory processing elements 212 provide capability for performing computation or other analyses on memory-routed data, and determining what to do with data which arrives at the system 200.

Figure 3:
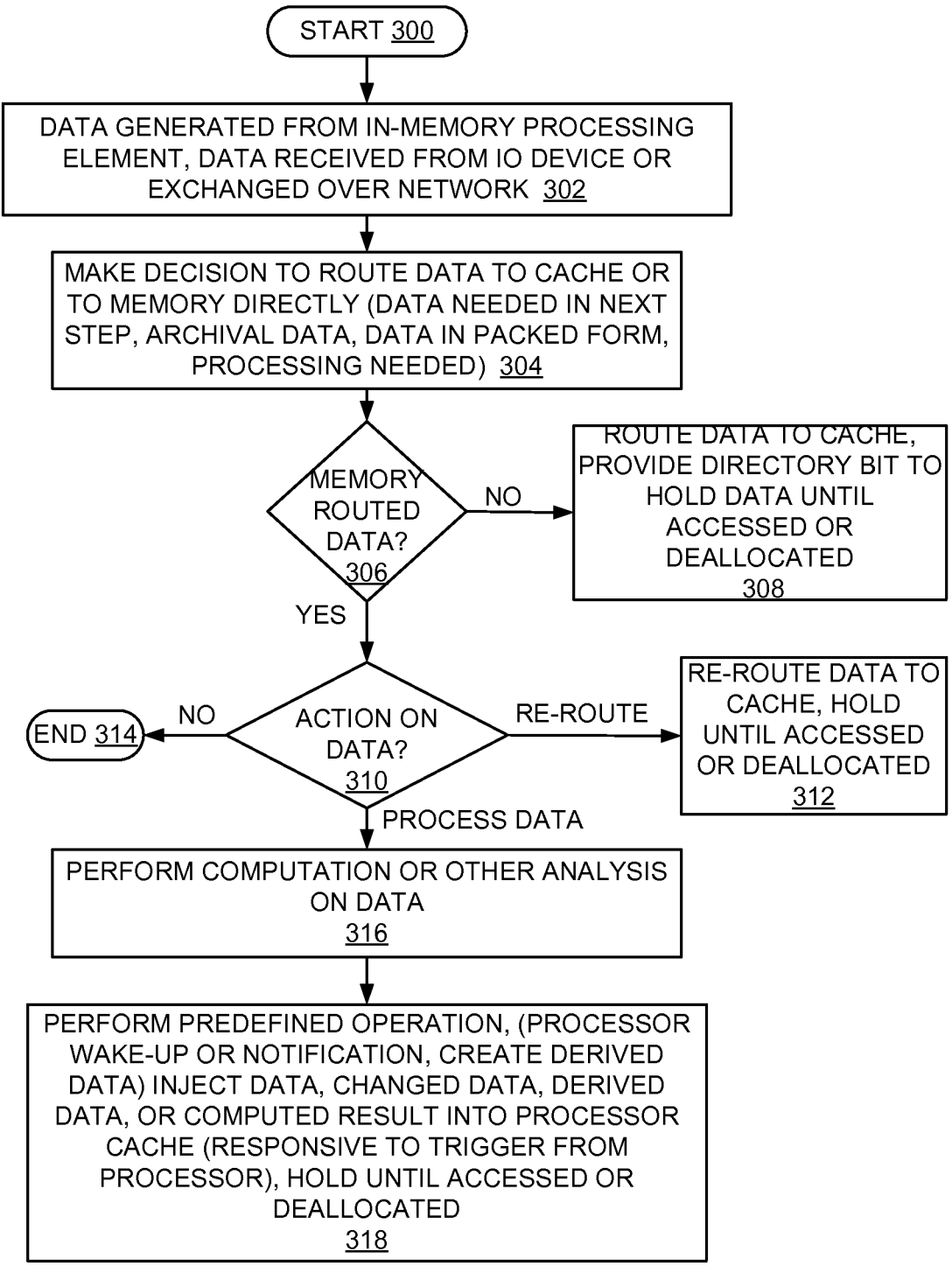
FIG. 3 is a flow chart illustrating example operations for implementing memory hierarchy placement decisions including direct routing of arriving data into a main memory system and selective injection of the data or computed results into the processor cache in the memory system of FIG. 2 in accordance with the preferred embodiments.

Referring also to FIG. 3, there are shown example operations for implementing memory hierarchy placement decisions including direct routing of arriving data into a main memory 210 and selective injection of the data or computed results into the processor cache 104 in the memory system 200 in accordance with the preferred embodiments. As indicated in a block 300, operations start and data generated from the in-memory processing element, data received from an IO device or data exchanged over the network as indicated in a block 302.

As indicated in a block 304, a decision is made to route data to cache or directly to main memory. The decision at block 304 to place the data into the processor cache optionally is based upon the data being needed immediately in a next step. Alternatively the decision at block 304 to place the data directly into the main memory optionally is based upon the data being archival, and may never need to go into the cache. The decision at block 304 to place the data directly into the main memory optionally is based upon the data coming in a packed form and needing to be distributed to different data structures before computation, the data can be stored in the active memory, and redistributed into the memory of the data structure through a program stored in the memory itself. The decision at block 304 to place the data directly into the main memory optionally is based upon the data not being needed immediately in a next step, and further processing being needed. For example, at block 304 if the data needs to be merged with data from other parts (or this part) of the network before use, the active memory can perform the merge and place the data into the processor cache. Also, at block 304 for example, if the data needs to be merged with data from other parts (or this part) of the network before use, the active memory can be triggered to perform the merge on demand by the processor and return the computed values.

As indicated in a decision block 306, checking for memory routed data sent directly to the main memory, without insertion into cache, is performed. When the data is not memory routed data, then the data is routed to cache, and held until the data is accessed or deallocated as indicated in a block 308. The injected cache data includes, for example, directory bits that are set to prevent eviction, and that are cleared when the data is accessed or deallocated by the processor. Alternatively, the injected cache data includes set state information to prevent premature eviction, such as a most-recently-used (MRU) state to give the injected cache data the longest life span in cache. Alternatively, the injected cache data is provided in cache injection range registers to prevent premature eviction to keep the injected cache data in cache.

When the data is memory routed data, then checking for action on the data is performed as indicated in a decision block 310. When a data re-route to cache is identified, then the data is rerouted to cache and held until the data is accessed or deallocated as indicated in a block 312. When no action is identified at decision block 310, then the operations end as indicated in a block 314. When processing of the data is identified at decision block 310, then computation or other analysis on the data is performed as indicated in a block 316.

As indicated in a block 318, a predefined operation, such as, that may include computations and other decisions may be performed independently in the main memory system, the injection process may include a processor wake-up or notification function, such as based on monitoring of some location which indicates data is ready. At block 318 the injected cache data is held until the data is accessed or deallocated. Injection of data or computed results from main memory into the processor cache at block 318 can be speculative, such as prefetch, since the process might not actually use the value the memory entities put into the processor cache. Also, at block 318 for example, derived data can be created, which is then pre-loaded into the cache for potential additional computation. At block 318 for example, injection of data or computed results from main memory into the processor cache might be in response to the processor sending a trigger, such as a special load or store instruction, to prompt computation on the data in memory and deposit filtered results back into the processor cache for potential additional computation.

Figure 4:
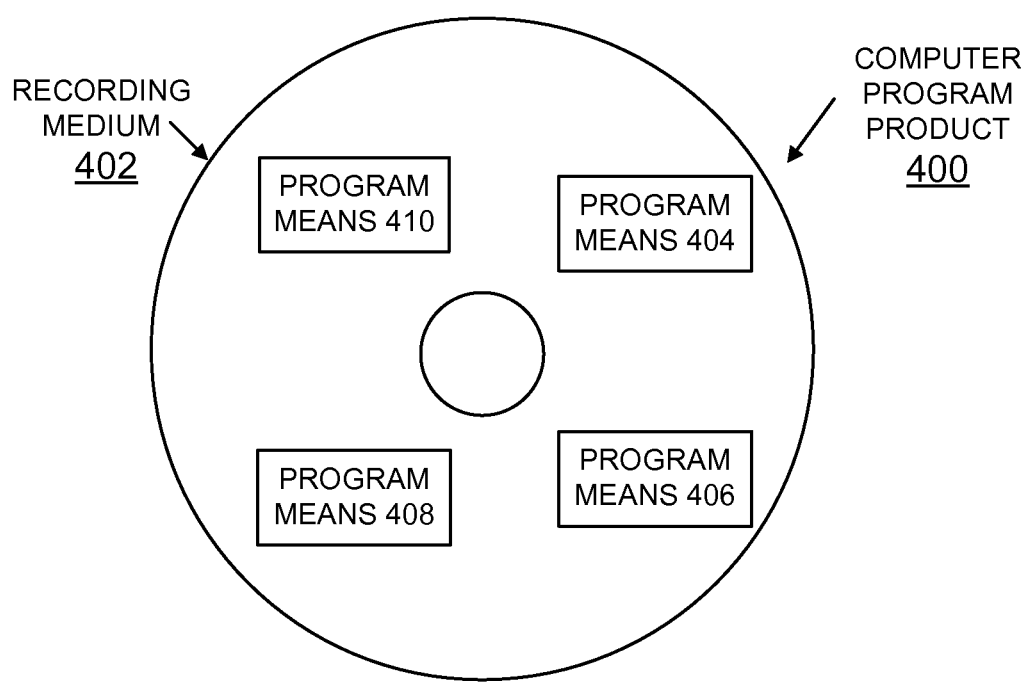
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing memory hierarchy placement decisions of the preferred embodiment in the system 100 of FIG. 1, and memory system 200 of FIG. 2.

A sequence of program instructions or a logical assembly of one or more interrelated modules defined by the recorded program means 404, 406, 408, and 410, direct the computer system 100, and memory system 200 for implementing memory hierarchy placement decisions of the preferred embodiment.

While the present invention has been described with reference to the details of the embodiments of the invention shown in the drawing, these details are not intended to limit the scope of the invention as claimed in the appended claims.

What is claimed is:

1. A method for implementing memory hierarchy placement decisions in a memory system in a computer system comprising:

routing arriving data directly into a memory system;
selectively injecting the data into a processor cache; and
using one of a memory controller and a processing element in the memory system, selectively driving placement of the data into a level of the memory hierarchy.

2. The method as recited in claim 1 wherein selectively injecting the data into the processor cache includes holding the injected data until accessed or deallocated by a processor.

3. The method as recited in claim 2 includes providing a directory bit with the injected data to prevent eviction, and clearing the directory bit with the injected data being accessed or deallocated by the processor.

4. The method as recited in claim 1 includes one of triggering a decision for selectively injecting the data or computed results into the processor cache based upon arrival of data from an IO device; triggering a decision for selectively injecting the data or computed results into the processor cache based upon a result of computation using the data; or triggering a decision for selectively injecting the data or computed results into the processor cache based upon a directive of an in-memory processing element.

5. The method as recited in claim 1 wherein selectively injecting the data into the processor cache includes updating state information for the injected data into the processor cache.

6. The method as recited in claim 1 wherein selectively injecting the data into the processor cache includes sending a processor notification for processing injected data.

7. The method as recited in claim 1 wherein the data includes one of changed data, derived data, computed results, and generated data, and includes selectively injecting one of the arriving data, changed data, derived data, computed results and generated data into the processor cache.

8. The method as recited in claim 1 wherein selectively injecting the data into the processor cache includes sending processor prefetch information into the processor cache.

9. The method as recited in claim 1 includes rerouting computed or changed data into the processor cache.

* * * * *